(No Model.) 3 Sheets—Sheet 3.
W. BAXTER, Jr.
ELECTRIC GENERATOR.
No. 519,280. Patented May 1, 1894.
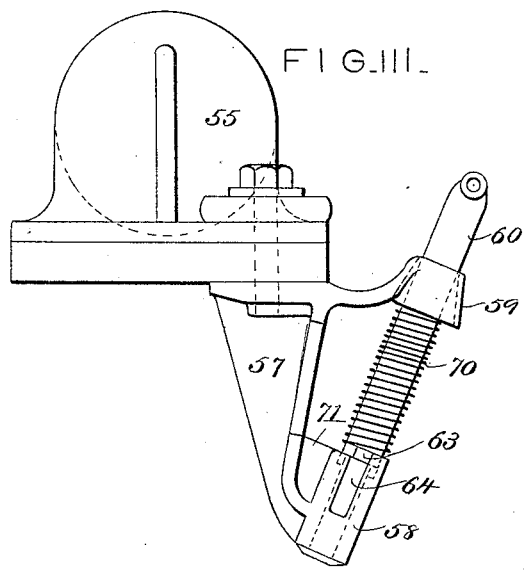
FIG. III.
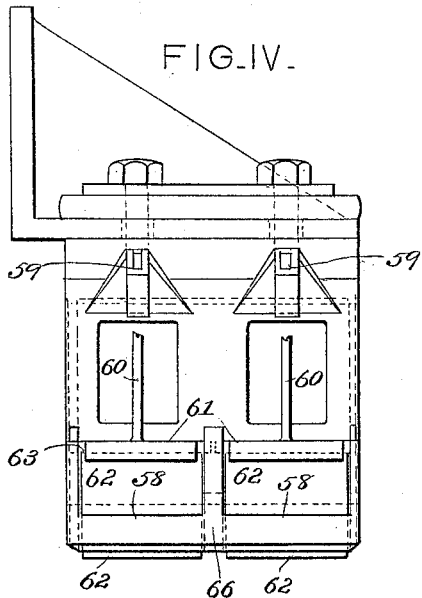
FIG. IV.
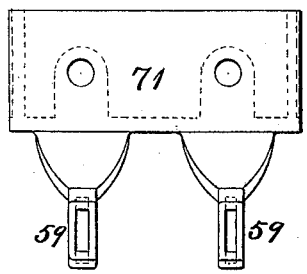
FIG. V.
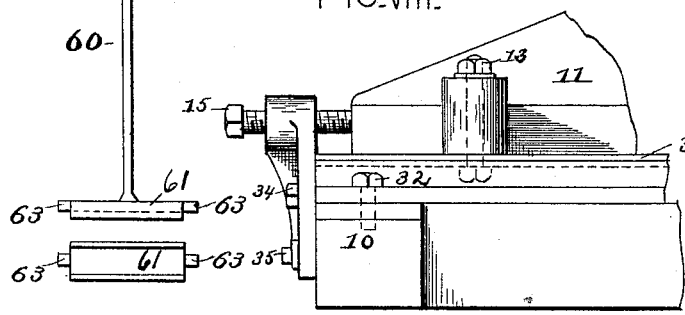
FIG. VI.   FIG. VIII.
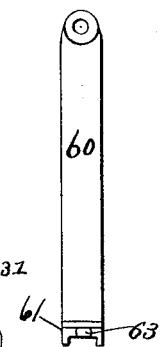
FIG. VII.
Witnesses:
Harry F. Rohrer
Geo. A. Knight.
Inventor:
Wm. Baxter Jr.
By Hervey S. Knight
Attorney.
THE NATIONAL LITHOGRAPHING COMPANY,
WASHINGTON, D. C.

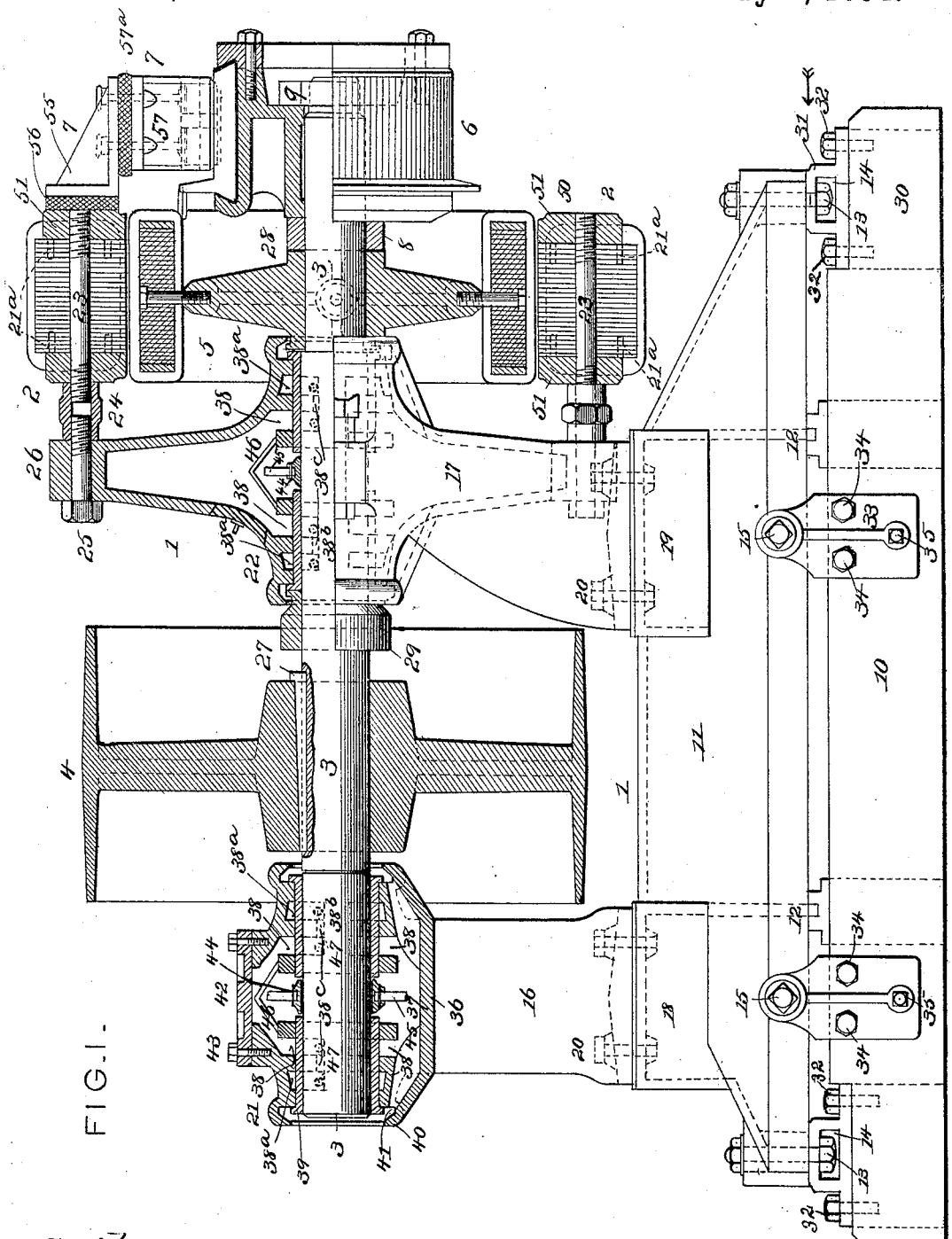

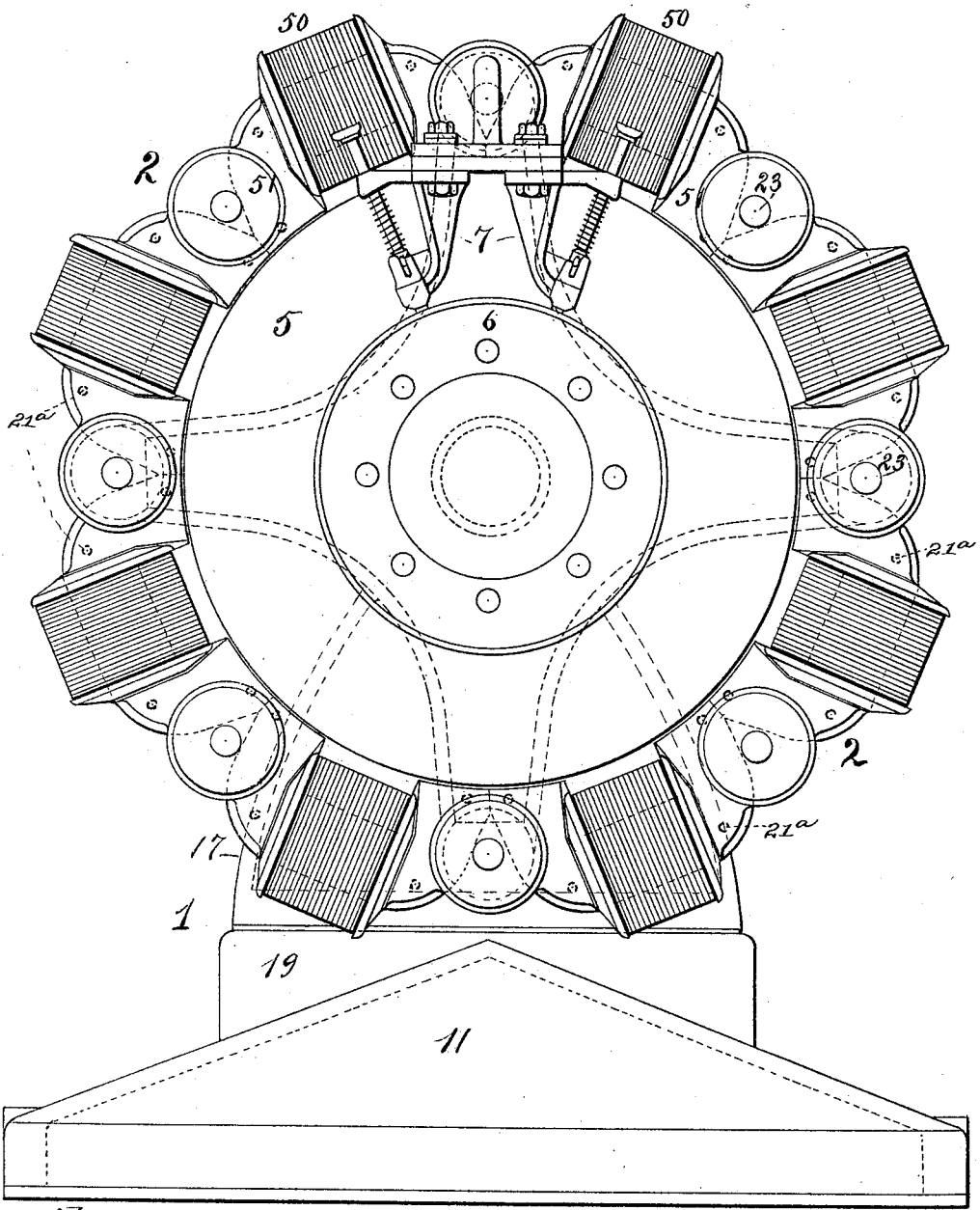

UNITED STATES PATENT OFFICE.

WILLIAM BAXTER, JR., OF BALTIMORE, MARYLAND.

ELECTRIC GENERATOR.

SPECIFICATION forming part of Letters Patent No. 519,280, dated May 1, 1894.

Application filed May 12, 1891. Renewed October 16, 1893. Serial No. 488,327. (No model.)

*To all whom it may concern:*

Be it known that I, WILLIAM BAXTER, Jr., a citizen of the United States, residing at Baltimore, State of Maryland, have invented certain new and useful Improvements in Electric Generators, of which the following is a specification.

My present invention though adapted for electric motors is designed more particularly for dynamo electric machines capable of standing the strain of a machine of large output and developing currents of great quantity while demanding a minimum amount of attention.

In constructing machines of this class it is very desirable to divide the field magnets into a number of poles so as to get the requisite lines of force with the least amount of material and reduce the length of the magnetic circuits and thereby obtain the magnetic field with the least amount of energy. I therefore construct the field magnets of an annular series of eight magnets whose adjacent poles are of like polarity and connected together and whose windings and poles all lie in the vertical plane of the armature. The armature is thus made very large in diameter compared with the dimensions of the machine and therefore the requisite electro-motive force is developed at a comparatively low rate of rotation. The commutator is likewise made large both axially and in circumference and the brushes which bear upon the plates are divided into sections so as to gain a more intimate contact. The machine may be arranged to operate with two brushes or as many brushes as there are poles.

In order to provide a strong and rigid frame for the machine a four-armed spider extends upward from a suitable base and supports the field magnets at the extremities of its four arms and provides at its center a bearing for the armature shaft between the armature and pulley while the outer end of said shaft is supported in a bearing mounted on the upper end of a standard which extends upward from the same base. The pulley on the armature shaft is located between the spider and the standard and the shaft is prevented from shifting longitudinally by means of the hub of the armature and a fixed collar which abuts against the opposite ends of the bearing formed in the spider. Suitable transverse bracing webs are formed on the several parts of the frame which support the machine and the whole is mounted so as to slide laterally upon a suitable bed. I thus obtain a highly efficient machine convenient for use, simple in construction and occupying a comparatively small amount of floor space.

My invention consists in certain details in the construction of the respective parts which will be particularly pointed out in the claims being first fully described with reference to the accompanying drawings, in which—

Figure I is a side view of my machine partly in vertical axial section. Fig. II is a front view of the machine. Fig. III is a front view of the brush holder bracket having one of the hangers attached. Fig. IV is a side elevation of the same having attached the hanger opposite to that shown in Fig. III and the upper part of the presser rod being broken away. Fig. V is a plan of one of the hangers. Fig. VI represents in side elevation and bottom view one of the presser rods and Fig. VII is a view of one of the presser-rods in position at right angles to that shown in Fig. VI and in the same position as shown in Fig. III. Fig. VIII is a detail end view of a portion of the base looking in the direction of the arrow, Fig. I showing more clearly the connection of the base 11 to the bed 10, including the track and its adjustment.

My machine consists of the frame 1, the field magnets 2, supported on the frame, the shaft 3 journaled in the frame concentrically with the field and carrying a drive-pulley 4, an armature 5, and a commutator 6, and the brush holder 7, supported from one or each alternate pole coupling and overhanging the commutator. The frame which is mounted on a bed 10 consists of a pyramidal or otherwise suitably formed base 11 supported on said bed by means of tracks 12, secured by bolts 13 working in T-slots 14 and adjusted by means of set screws 15; the standard 16 and four-armed spider 17, secured by bolts 20 upon the seats 18 and 19 which are formed integrally with the base 11; and the bearings 21, 22, formed in the standard and four-armed spider respectively. The field magnets are secured by means of screw rods 23, sleeves 24 and bolts 25 to the extremities 26 of the four-armed spider 17. The shaft 3 is secured against longitudinal shifting in its bearings 21 22 by means of a hub 28 of the armature 5 and a collar 29 which are keyed or otherwise secured to the shaft 3 and abut against the opposite ends of the bearing 22 formed in the spider. The bed 10 is provided at its corners with steps 30 which receive and support the T-slot iron 31 which is secured to said steps by means or screws 32.

33 represents brackets secured by bolts 34, 35, to the bed in a vertical position and these afford bearings for the adjusting screws 15.

36 represents the shell of the bearing 21, and 37 represents the chamber in said bearing which receives the oil to be utilized in lubricating the bearing. The bearings 21, 22, are provided with channels 38, 38$^a$ and perforated sleeve 39, the channels being adapted to convey oil to the perforations in the sleeves, and the sleeves forming bearings for the shaft. The sleeves are provided with suitable end flanges and are inserted from opposite ends of the bearings. They are of such length as to leave a central space between them for the accommodation of oil.

40 represents annular guard flanges formed on the outer ends of the bearings and these serve to catch all the oil which escapes from the ends of the bearing, said oil being returned through the longitudinal passages 41 to the central reservoir 37.

42 represents a cap-plate secured to the upper shell of the bearing 21 by means of screws 43.

44 represents agitators secured to the shaft between the ends of the bushing sleeves 39, and these agitators are provided with arms 45 which throw the oil up on the walls of the bearing from whence it trickles down and passes into the shaft to lubricate it. The channels 38 and 38$^a$ are cut off by longitudinal ribs 38$^b$ and said channels communicate at bottom through passages 38$^c$.

46 are oil sheds which extend inward from the vertical walls of the bearings and deliver the oil into the adjacent channels 38 whence it passes in to the other channels 38$^a$ through passages 38$^c$ and thence to the shaft 3 through apertures 47 formed in the bushing sleeves.

The bearing formed in the spider, though substantially the same as that formed in the standard, differs in that the spider, being made hollow, the inner chamber or oil reservoir is larger and instead of having a cap plate on top a suitable hand hold covered by a cap plate may be formed between two of the spider arms. In both cases agitators 44 having arms 45 are secured to the shaft so as to rotate with it for the purpose of throwing the oil up on the inner walls of the chambers.

The field magnets 2 comprise an annular series of eight magnets 50 whose adjacent poles are of like polarity and connected together by means of clamps formed of the face plates 51 screw rods 23, and dowel pins 21$^a$ as set forth in another application of even date herewith, and serially numbered 392,516. Alternate ones of the screw rods 23 serve in connection with sleeves 24 and bolts 25, to attach the field to the spider. If desired, the intermediate clamps may be provided with simple rivets suitably headed into the face plates instead of the screw rods. Between the commutator and armature is inserted a sleeve 8 and this serves to space the said parts and communicate to the armature the pressure imposed by securing nuts 9.

The field magnets, the armature and the commutator are constructed substantially similar to the corresponding parts in my copending application on improvements in electric motors and I therefore do not claim the same herein but reserve the right to claim the novel features thereof in my said co-pending application.

The brush holder in my present application is preferably constructed similar in principle to that described and claimed in my copending application above referred to except that in my present case, owing to the fact that the brush is unusually large I prefer to separate the same into independent sections in order that a more intimate contact may be insured between the brush and commutator plates and also to permit the removal of one part of the brush when it becomes worn without necessitating the removal of the entire brush. To these ends the bracket 55 which is secured to the face plate 51 with interposed insulation 56 supports hangers 57, (which are insulated from bracket 55 by insulating plate 57$^a$) with two sockets 58 and guide sleeves 59, which sockets, when the hanger is properly secured to the bracket, lie in a plane parallel to the axis of the machine, or in other words the brushes lie longitudinally along the commutator plates. Two independent presser rods 60 which work in the guide sleeves 59 have the bearing feet 61 which are adapted to fit over the upper edges of the brushes 62 and are provided with transverse ends 63 engaging in slots 64 in the sockets.

In constructing a pair of sockets side by side a simple slotted partition may be formed between them.

The construction of the hangers may be readily understood with reference to Figs. III, IV and V; the construction of the presser rod may be seen upon reference to Figs. VI and VII and the adaptation of the latter to the former is shown in Figs. III and IV, the projecting spring 70 being shown in Fig. III. The spring 70 is confined between the guide sleeve 59 and the bearing foot 61 so as to maintain a constant pressure through said foot upon the brush and keep the latter in contact with the commutator plates, and in order to remove one of the brushes it is simply necessary to withdraw the presser rod until the transverse projections 63 are disengaged from the slots and deflect said presser rod until the presser foot rests upon the shoulder 71. The deflection of the rod in the guide sleeve 59 is permitted by the nature of said sleeve inasmuch as its opening is made flaring for the purpose. When the brush is removed and a new one inserted the rod is shifted back until it snaps into place on top of the brush.

If desired, a pair of brushes may be attached at each of the extremities of the spider arms.

I do not herein claim the specific construction of the parts of the brush holder or of other parts of my machine which are described in my aforementioned co-pending application as I have claimed the same therein.

Having thus described my invention, the following is what I claim as new therein and desire to secure by Letters Patent:

1. In a dynamo electric machine, the combination of the bed 10, the base 11, the seats 18, 19, formed on said base, the vertical supports 16, 17, bolted to said seats and extending upwardly therefrom, the shaft journaled in said supports and carrying the commutator and armature and the field magnet secured to one of said supports, substantially as and for the purpose set forth.

2. In an electrical machine, the combination of a suitable base, the vertical supports extending upward from the base, the shaft journaled in said supports, the pulley secured to the shaft between the supports, the armature and commutator secured to the shaft outside of one of the supports and the field magnets secured to one side of one of said supports and surrounding the armature; all substantially as and for the purposes set forth.

3. The combination of a suitable base, the vertical standard and the four armed spider extending upward from said base, the shaft, bearings in said standard and spider for the shaft, the pulley secured to said shaft between the standard and spider, the field magnets secured to the spider on the opposite side from the pulley, the armature located within the field magnets, keyed to the shaft and having a hub abutting against the outer end of the bearing of said spider, a fixed collar on the shaft abutting against the opposite bearing in said spider, and the commutator on the outer end of the shaft adjacent to the armature; all substantially as and for the purposes set forth.

4. The combination of the frame, the field magnets mounted on the frame, the shaft fixed rotatably in the frame, the armature and commutator mounted on the shaft, the sleeve between the armature and commutator and the nut on the shaft, impinging against the commutator, whereby said armature and commutator are secured, as explained.

5. The combination, in a brush holder of a bracket, the hangers secured to the bracket and each having a downwardly flared guide sleeve and a socket, and the presser rod passing through said sleeve and engaging a brush held in said socket, substantially as set forth.

6. The combination, in a brush holder, of a bracket, the hangers secured to said bracket and each having a sleeve and a socket, the brush arranged in the socket and the presser-rod passing through said sleeve and having feet embracing said brush, substantially as set forth.

7. The combination in a brush holder, of a bracket, the hangers secured to said bracket and each having a sleeve and a socket, the brush held in said socket, and the presser rods having engagement with said brush and provided with end projections engaging slots in said socket, substantially as set forth.

8. The combination of the bracket, the hangers secured thereto and having the downwardly flared sleeves and the sockets, the brushes held in said sockets and the spring pressed presser rods passing through said sleeves and having the feet engaging said brushes and end projections engaging slots in said socket, substantially as set forth.

9. In a brush holder the combination of the hanger having the lower brush socket and the upper guide sleeve, the presser rod adapted to bear with its lower end above the socket and working in the guide sleeve, and the spring for forcing said presser rod downward, substantially as set forth.

10. In a brush holder the combination of the hanger having the brush socket and the guide sleeve, the presser-rod working in said sleeve and having a cross head adapted to bear about said socket and a spring confined between the sleeve and cross head, substantially as and for the purpose set forth.

11. The combination of the hanger, having the brush socket and the guide sleeve, the presser rod working in the guide sleeve, and adapted to press above the socket, and a spring for projecting the presser rod; said guide sleeve being enlarged so as to permit the deflection of the rod, and said hanger being provided with a shoulder, adjacent to the socket, upon which the rod may rest, as and for the purpose set forth.

12. The combination of the hanger having a brush socket and a guide sleeve, the presser rod working in said guide sleeve and adapted to enter said socket, and a projecting spring on said presser-rod; said socket being provided with transverse slots and said presser rod being provided with transverse projections adapted to enter said slots substantially as and for the purpose set forth.

WILLIAM BAXTER, JR.

Witnesses:
WM. ELLIS COALE,
ISAAC COALE, Jr.